(12) United States Patent
Patočka et al.

(10) Patent No.: US 9,588,693 B2
(45) Date of Patent: Mar. 7, 2017

(54) PERFORMING DISCARD COMMANDS ON RAID STORAGE DEVICES

(71) Applicant: Red Hat, Inc., Raleigh, NC (US)

(72) Inventors: Mikuláš Patočka, Prague (CZ); Michael A. Snitzer, Shirley, MA (US)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/679,376

(22) Filed: Apr. 6, 2015

(65) Prior Publication Data

US 2015/0227317 A1    Aug. 13, 2015

Related U.S. Application Data (63) Continuation of application No. 12/956,250, filed on Nov. 30, 2010, now Pat. No. 9,009,388.

(51) Int. Cl.
| | |
|---|---|
| *G06F 12/00* | (2006.01) |
| *G06F 3/06* | (2006.01) |
| *G06F 12/02* | (2006.01) |

(52) U.S. Cl.
CPC .......... *G06F 3/0608* (2013.01); *G06F 3/0611* (2013.01); *G06F 3/0644* (2013.01); *G06F 3/0652* (2013.01); *G06F 3/0688* (2013.01); *G06F 3/0689* (2013.01); *G06F 12/0238* (2013.01)

(58) Field of Classification Search
None
See application file for complete search history.

(56) References Cited

U.S. PATENT DOCUMENTS

| | | | |
|---|---|---|---|
| 9,009,388 B2 * | 4/2015 | Patočka et al. ..... | G06F 12/0238 711/103 |
| 2004/0024963 A1 | 2/2004 | Talagala et al. | |
| 2012/0059976 A1 | 3/2012 | Rosenband et al. | |

OTHER PUBLICATIONS

Black, David L., "EMC2 where information lives", SBC-3: WRITE SAME unmap bit (08-356r4), memo to INCITS Technical Committee T10 dated Dec. 10, 2008, pp. 1-4.
Massiglia, P., (1977) "The raid book: A Storage system technology handbook", (6th ed., pp. 84-86, 92, 102). The RAID Advisory Board Inc.
"TRIM", printed from Internet—http://en.wikipedia.org/wiki/TRIM on Nov. 30, 2010, pp. 1-5.

* cited by examiner

*Primary Examiner* — Daniel Tsui
(74) *Attorney, Agent, or Firm* — Lowenstein Sandler LLP (57) ABSTRACT

An example method for performing discard commands on Redundant Array of Independent Disks (RAID) devices may comprise receiving a request to free a range of logical sectors that is mapped to a plurality of storage devices organized as RAID. The method may further comprise identifying a first physical sector number corresponding to a first logical sector having a lowest number greater or equal than a starting logical sector number of the range of logical sectors. The method may further comprise identifying a second physical sector number corresponding to a second logical sector having a lowest number greater or equal than an ending logical sector number of the range of logical sectors. The method may further comprise issuing a single command to all of the plurality of storage devices to free a range of sectors identified by the first physical sector number and the second physical sector number.

20 Claims, 10 Drawing Sheets

A RAID SYSTEM THAT USES PARITY

PERFORMING DISCARD COMMANDS ON RAID STORAGE DEVICES

RELATED APPLICATIONS

This application is a continuation of U.S. patent application Ser. No. 12/956,250 filed on Nov. 30, 2010, the entire content of which is incorporated by reference herein.

TECHNICAL FIELD

Embodiments of the present invention relate to a computer system, and more specifically, to the management of Redundant Array of Independent Disks (RAID) storage devices.

BACKGROUND

Redundant Arrays of Independent Disks (RAID) improve storage reliability and increase throughput. A RAID system combines multiple storage devices into a logical unit, and distributes data across the multiple storage devices. A number of standard RAID levels can be used for setting up a RAID system: such as RAID-0, RAID-1, RAID-2, RAID-3, RAID-4, RAID-5 and RAID-6. Each RAID level has a different requirement on data distribution and the use of parity.

Many current RAID systems use multiple solid-state disks (SSDs) as the underlying storage devices. SSDs retain persistent data in non-volatile solid-state memory chips and contain no moving parts. In contrast, conventional hard disk drives are electromechanical devices that contain spinning disks and movable read/write heads.

A RAID system can be used in a thin provisioning environment. Thin provisioning relies on on-demand allocation of data blocks instead of allocating all of the blocks up front. Thin provisioning enables over-allocation or over-subscription. In a computer system that supports thin provisioning, an operating system typically maintains an internal free list to keep track of the data blocks that are available for use. When a user deletes a file, the data blocks used by the file can be kept in the free list for reuse by other users. The use of the free list in the underlying SSDs prevents memory fragmentation, improves performance of the SSDs, and enhances a wear-leveling mechanism inside the SSDs to further prolong the lifespan of the SSDs.

Due to the data distribution scheme and the use of parity in a RAID system, contiguous logical sectors used by a file can be broken down into non-contiguous physical sectors when mapped to physical sectors in a storage device. Generally, an operating system does not efficiently handle storage deallocation when logical sectors to be freed in a device are non-contiguous. Typically, each storage device needs to process multiple commands from the operating system for one file deletion operation. Thus, performance of the storage device can be degraded.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for efficiently freeing storage in a Redundant Array of Independent Disks (RAID) system. In one embodiment, a computer system is coupled to storage devices that are organized as a RAID with block-level striping. Each storage device is partitioned into multiple physical sectors. The computer system receives a request to free a contiguous range of logical sectors that are mapped to the storage devices. In response, the computer system issues, for each storage device, a discard command to free contiguous physical sectors in the storage device that correspond to non-contiguous logical sectors.

Embodiments of the present invention free storage space in a RAID system efficiently. Throughout the following description, the terms "logical sector" and "physical sector" refer to the sectors seen from a RAID driver's point of view. Herein, "logical" means what comes to the RAID driver and "physical" means what comes out of the RAID driver. The term "block" in "block-level striping" refers to a data segment having the size of at least one logical sector and/or physical sector.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Figure 1:
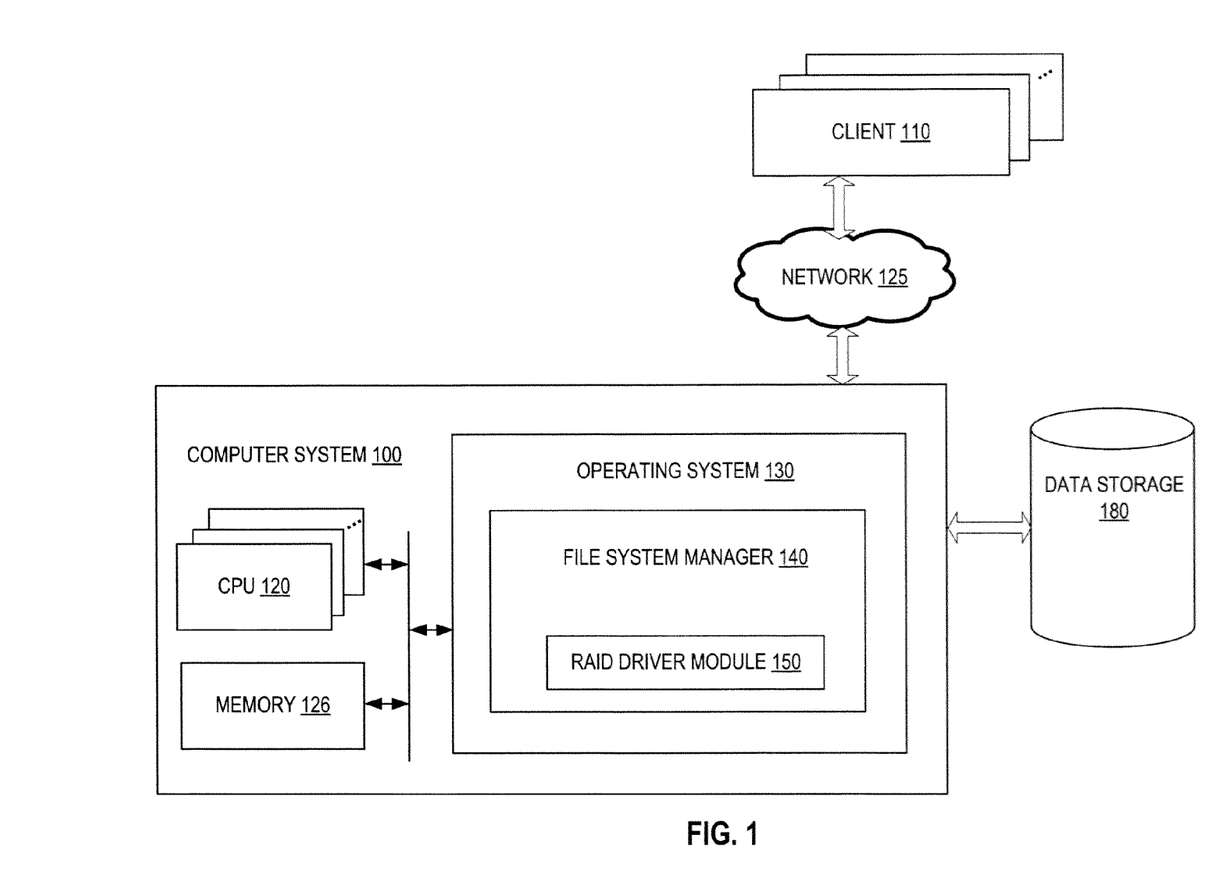
FIG. 1 is a block diagram of one embodiment of a computer system coupled to a RAID storage system.

FIG. 1 is a block diagram that illustrates an embodiment of a computer system 100. The computer system 100 may be a computer (e.g., a server, a workstation, a personal computer (PC), etc.). In one embodiment, the computer system 100 includes one or more central processing units (CPUs) 120 and memory 126. In one embodiment, the computer system 100 is coupled to a data storage 180 that includes mass storage devices, such as solid-state devices (SSDs), flash drives, magnetic or optical storage based disks, tapes or hard drives. The computer system 100 hosts an operating system 130 to manage its system resources, including management of storage allocation and deallocation.

In one embodiment, storage devices (hereinafter referred to as "devices") in the data storage 180 are organized as a RAID system with block-level striping, in which contiguous physical sectors can correspond to non-contiguous logical sectors. The size of each physical sector is a predetermined fixed size, such as 512 bytes or 4K bytes. Examples of the RAID system that satisfy the above criterion include RAID 0, 4, 5, 6, or other variations of the RAID levels. It will be appreciated by those skilled in the art, although RAID 0, 4, 5 and 6 are described in detail, embodiments of the present invention may be applicable to other RAID systems.

In one embodiment, the computer system 100 may be coupled to one or more clients 110 over a network 125 and capable of functioning as a storage server. Each client 110 may be a computer (e.g., a server, a workstation, a personal computer (PC), a laptop, etc.), a mobile phone, a hand-held computing device, a game station, a personal digital assistant (PDA), etc. The network 125 may be a private network (e.g., a local area network (LAN), a wide area network (WAN), intranet, etc.) or a public network (e.g., the Internet). In an alternative embodiment, the computer system 100 may be a standalone computer. The clients 110, applications, or users of the computer system 100 may access the content of the data storage 180 through a file system manager 140 in the operating system 130.

According to one embodiment of the present invention, the computer system 100 includes a RAID driver module 150 implementing the function of a RAID driver for access to the data storage 180. The RAID driver module 150 may be implemented by software (e.g., as part of the file system manager 140), hardware (e.g., as part of a dedicated RAID controller card), or a combination of both. The RAID driver module 150 maps a data access request, which indicates a range of contiguous logical sectors, to physical sectors in the devices. When a user requests deleting a file, the RAID driver module 150 translates the logical sectors used by the file into physical sectors and device numbers. The RAID driver module 150 issues a single discard command to each device to free the physical sectors. The freed sectors are tracked by the file system manager 140 to allow reuse in the future.

Embodiments of the present invention can be useful in a thin provisioning system where storage is allocated on demand. Embodiments of the present invention can also be beneficial to data storage that uses SSDs as underlying storage devices. As each device only processes a single discard command for each file deletion operation, the performance of the devices can be improved.

Figure 2:
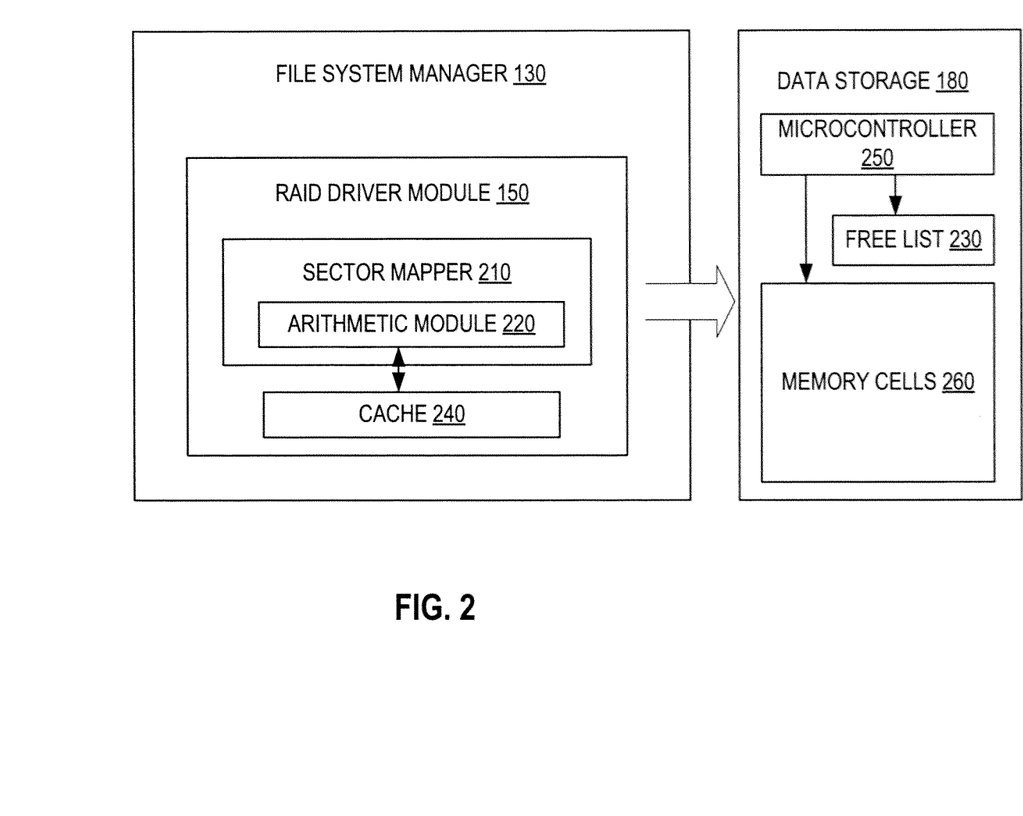
FIG. 2 is a block diagram of one embodiment of a RAID driver module in the computer system.

FIG. 2 is a block diagram that illustrates an embodiment of the RAID driver module 150 in more detail. In this embodiment, the RAID driver module 150 includes a sector mapper 210 to translate a range of logical sectors into a range of physical sectors in each device. The translation involves mathematical calculation, which is performed by an arithmetic module 220. In one embodiment, the arithmetic module 220 performs divisions and modulo operations to calculate the range of physical sectors to be freed. The result of the calculation can be cached in a cache 240 for later reuse.

In one embodiment, the data storage 180 includes a microcontroller 250 to control the data access of memory cells 260 (e.g., flash memory cells). The microcontroller 250 manages the mapping of physical sectors to the memory cells 260 and a free list 230 of reusable memory cells 260. After the data storage 180 completes a discard operation, the microcontroller 250 may record identifiers of the discarded (equivalently, "freed" or "deallocated") memory cells 260 in the free list 230.

Figure 3:
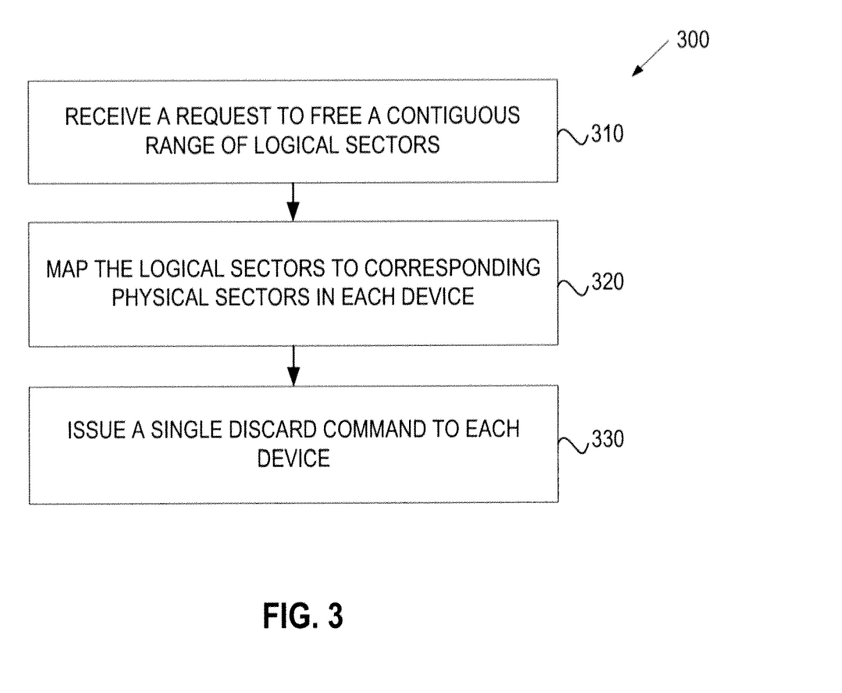
FIG. 3 is a flow diagram of one embodiment of a method for issuing discard commands to a RAID system.

FIG. 3 is a flow diagram illustrating one embodiment of a method 300 for deallocating storage space in a RAID system with block-level striping, in which contiguous physical sectors can correspond to non-contiguous logical sectors. The method 300 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 300 is performed by the RAID driver module 150 of FIG. 1 and FIG. 2 in the computer system 100.

Referring to FIG. 3, in one embodiment, the method 300 begins with the RAID driver module 150 receiving a request to free a contiguous range of logical sectors (block 310); e.g., when a file using these logical sectors is to be deleted. In response, the RAID driver module 150 maps the logical sectors to corresponding physical sectors in each device (block 320). In one embodiment, the RAID driver module 150 may perform two divisions and two modulo operations for calculating the corresponding physical sectors in each device. Based on the result of the calculation, the RAID driver module 150 issues one discard command to each device (block 330). The discard command for a device indicates a range of contiguous physical sectors, which may span over one or more chunks. A chunk is a fixed-size (e.g., 64K-byte, 256K-byte, etc.) partition of storage space in a device and contains a fixed number of physical sectors. Contiguous physical sectors within one chunk generally correspond to contiguous logical sectors. However, when contiguous physical sectors span over more than one chunk, the corresponding logical sectors are non-contiguous. Embodiments of the present invention allow a single discard command to be issued to a device, when the corresponding logical sectors are non-contiguous as well as when the corresponding logical sectors are contiguous.

Figures 4A, 4B:
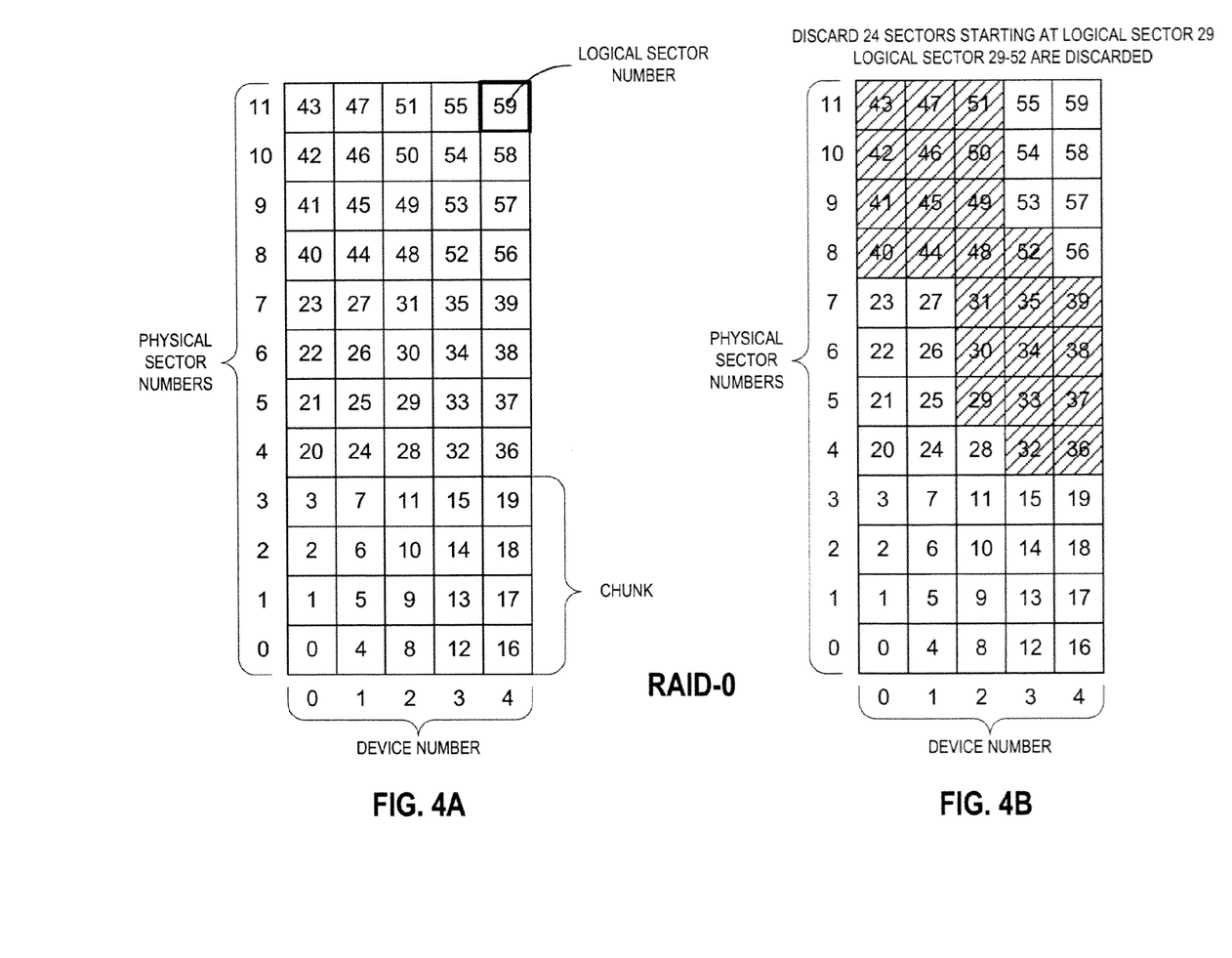
FIG. 4A is an example of a RAID-0 system layout and FIG. 4B is an example of a discard operation on the RAID-0 system.

FIG. 4A illustrates an example of a RAID-0 layout, and FIG. 4B illustrates an example of a result when discard commands are issued to devices having the RAID-0 layout. In the example, there are five devices (numbered 0-4) in the RAID-0. Each device contains the same number of physical sectors (numbered 0-11), partitioned into three chunks (with a chunk size of four physical sectors in this example). Each physical sector in the device corresponds to a logical sector and is represented by a square labeled with its corresponding logical sector number. While the physical sectors in each device are numbered sequentially from 0 to an upper bound number (e.g., 11 in this example), their corresponding logical sectors are numbered using a different scheme. Logical sectors in the first chunks (that is, physical sectors 0-3) are numbered first throughout all of the devices, followed by the second chunks of all of the devices, then third chunks, etc. The logical sectors numbers go up continuously throughout the devices. When the numbering of the logical sectors reaches a chunk boundary, the numbering continues to the next device or wrap around to the first device. In this example, the logical sectors are numbered from 0 to 59.

In the example of FIG. 4B, in response to a request (e.g., a file deletion request) to discard 24 sectors starting at logical sector number 29, the RAID driver module 150 issues a total of 5 discard commands to devices 0-5:

to device 0 (a discard command for discarding 4 sectors starting with physical sector number 8), to device 1 (a discard command for discarding 4 sectors starting with physical sector number 8), to device 2 (a discard command for discarding 7 sectors starting with physical sector number 5), to device 3 (a discard command for discarding 5 sectors starting with physical sector number 4), to device 4 (a discard command for discarding 4 sectors starting with physical sector number 4).

The discarded sectors are marked in FIG. 4B. For each of device 2 and device 3, the discard command causes physical sectors in two chunks to be discarded.

In one embodiment, when the RAID driver module 150 receives a request to free a range of logical sectors (indicated by a starting sector M and a number of sectors N) in a RAID-0 system or a variation thereof, the RAID driver module 150 performs the following calculation: for each device S:

call stripe_map_range(M, S), store result in A call stripe_map_range(M+N, S), store result in B if (A<B) then issue a discard command with the starting sector A and length (B−A) to the device S.

The function stripe_map_range receives a logical sector number (L) and a device number (S), and returns the physical sector number (P) in the device S that maps to the lowest logical sector greater than or equal to L. The RAID driver module 150 performs the following operation when the function stripe_map_range is called:

call stripe_map_sector(L); /*stripe_map_sector(L) returns device number S1 and physical sector P1*/ if (S1==S) return P1;

if (S1>S) return P1 rounded down to the chunk boundary;

if (S1<S) return (P1+1) rounded down to the chunk boundary. /*Rounding down x to y boundary means (x−(x % y)). If chunk size is a power of 2, this rounding down can be implemented as a bit mask, not modulo*/

The function stripe_map_sector is a generally known technique that translates a logical sector number to a device number and a physical sector number. For the purpose of clarity and completeness, operations of the function stripe_map_sector are described below:

offset_in_the_chunk=logical_sector % chunk_size; /*If chunk_size is a power of 2, this can be implemented as a bit mask, not modulo*/ logical_sector=logical_sector/chunk_size; /*If chunk_size is a power of 2, this can be implemented as a shift, not division*/ device_number=logical_sector % number_of_devices; /*a modulo operation is performed*/ physical_sector_number=(logical_sector/number_of_devices)*chunk_size+offset_in_the_chunk;

In the function stripe_map_sector, a division and a modulo operation is performed: logical_sector/number_of_devices (result equals the remainder) and logical_sector % number_of_devices (result equals the quotient). In one embodiment, a single instruction can be used to calculate both the quotient and the remainder. As described above, the RAID driver module 150 calculates the function stripe_map_range twice for each device. As a result, two divisions and two modulo operations are performed for generating one discard command to each device.

Figure 5:
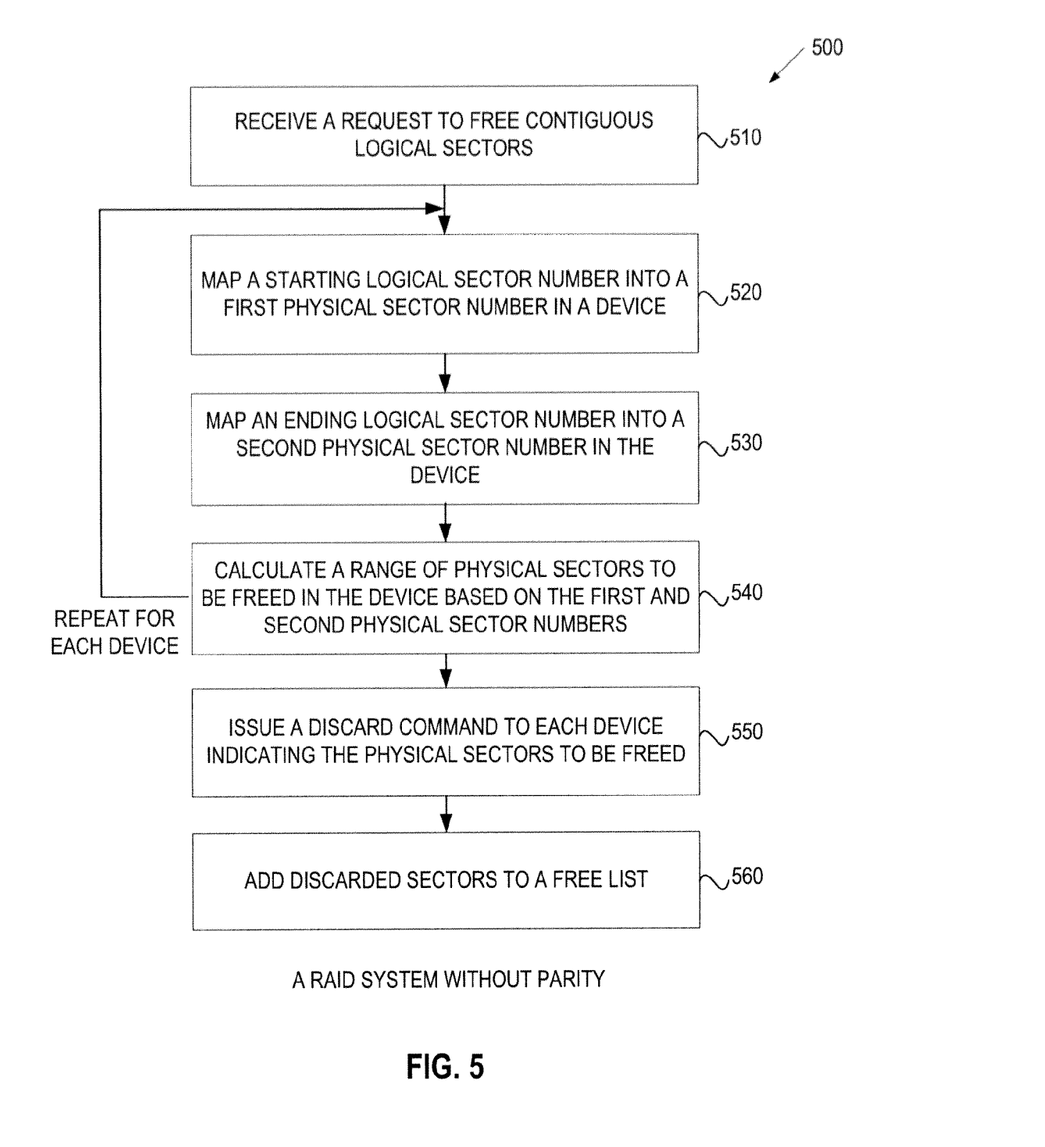
FIG. 5 is a flow diagram of one embodiment of a method for issuing discard commands to a RAID system that does not use parity.

FIG. 5 is a flow diagram illustrating one embodiment of a method 500 for freeing storage space in a RAID system that does not use parity (e.g., RAID-0). The method 500 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 500 is performed by the RAID driver module 150 of FIG. 1 and FIG. 2 in the computer system 100. It is understood that the method 500 is applicable to any RAID system with block-level striping, contiguous physical sectors can correspond to non-contiguous logical sectors, and where parity is not used.

Referring to FIG. 5, in one embodiment, the method 500 begins when the RAID driver module 150 receives a request to free a range of contiguous logical sectors (block 510); e.g., when a file using these logical sectors is to be deleted. The request indicates a starting logical sector number (e.g., M) and the total number of sectors to deallocate (e.g., N). In response to the request, for each device, the RAID driver module 150 calculates a starting physical sector number on the device based on the starting logical sector number M (block 520). The RAID driver module 150 also calculates an ending physical sector number on the device based on the ending logical sector number (M+N) (block 530). From the starting physical sector number and the ending physical sector number on the device, the RAID driver module 150 calculates a range of physical sectors to be freed in the device (block 540). The calculations of blocks 520-540 are repeated for each device. Based on results of the calculations, the RAID driver module 150 issues a discard command to each device, indicating physical sectors to be freed (block 550). The freed sectors can be added to a free list for reuse (block 560). It is understood that the order of the operations described above may be changed; for example, the discard command to a device may be issued before the discard range for another device is calculated.

Figures 6A, 6B:
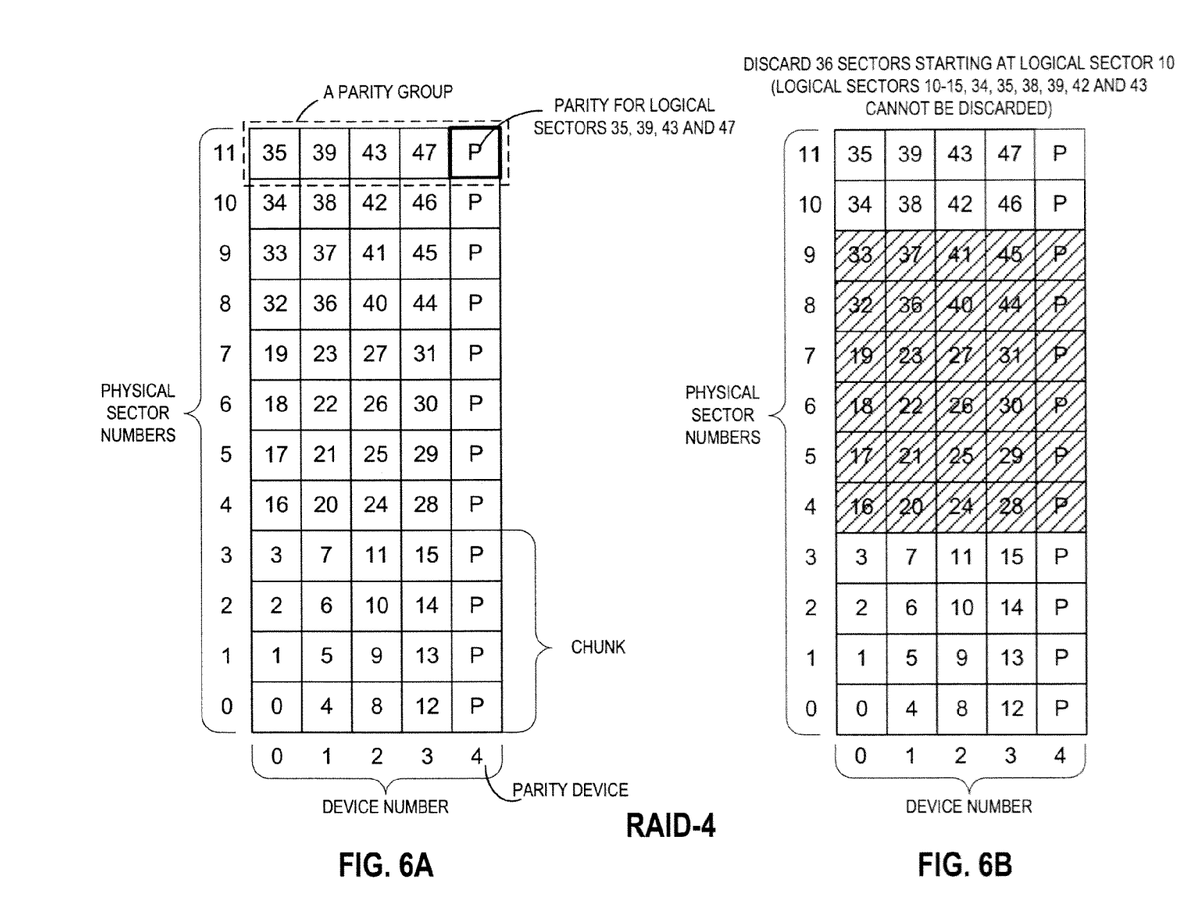
FIG. 6A is an example of a RAID-4 system layout and FIG. 6B is an example of a discard operation on the RAID-4 system.
Figure 7A:
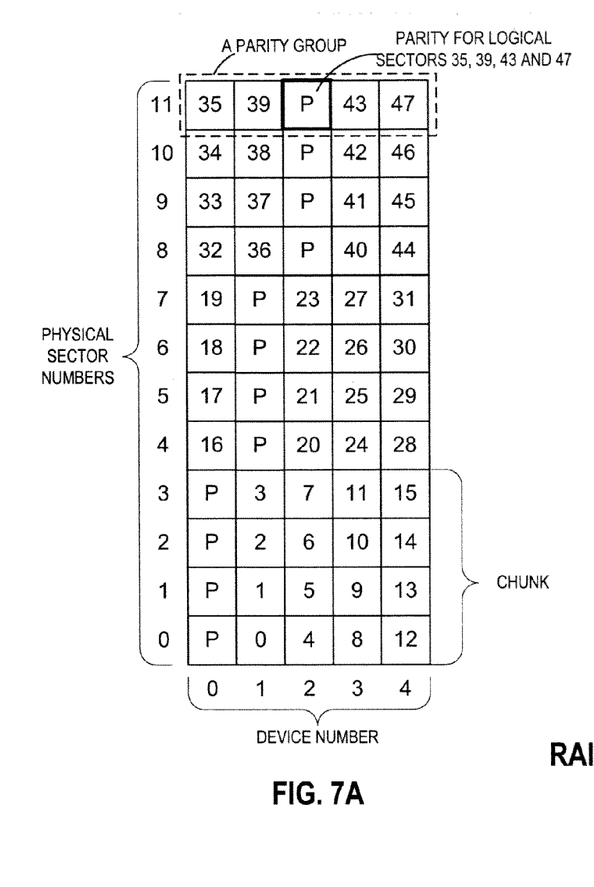
FIG. 7A is an example of a RAID-5 system layout and FIG. 7B is an example of a discard operation on the RAID-5 system.
Figure 7B:
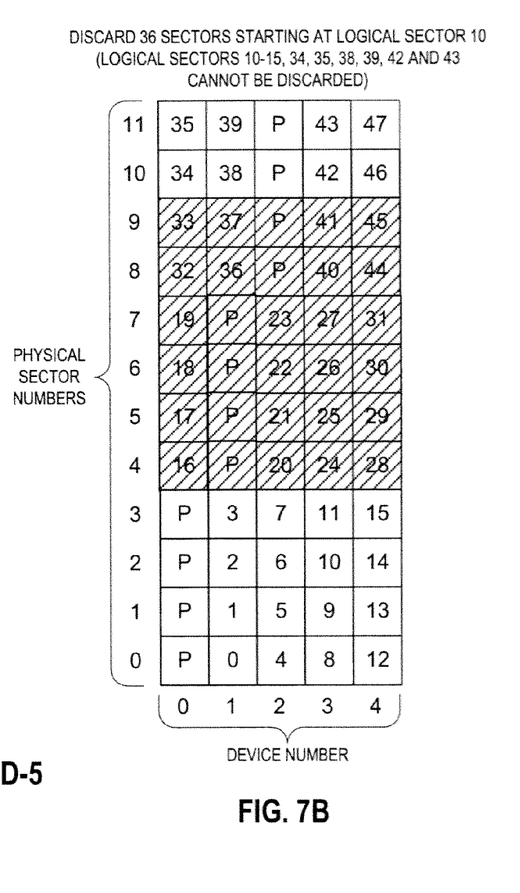
Figure 8A:
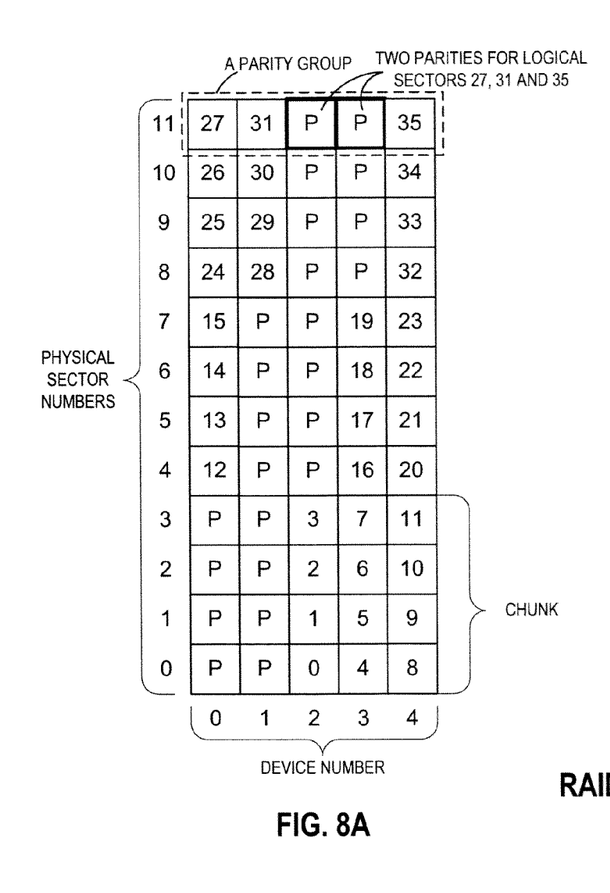
FIG. 8A is an example of a RAID-6 system layout and FIG. 8B is an example of a discard operation on the RAID-6 system.
Figure 8B:
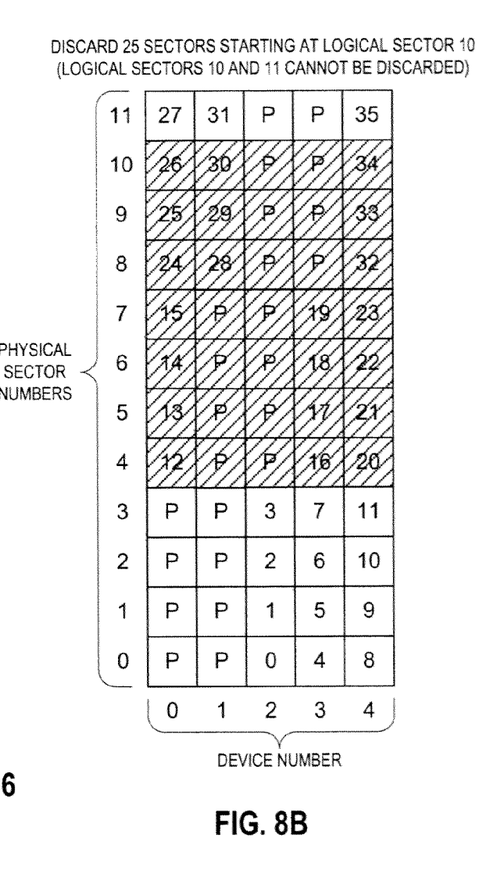

For a RAID system that uses parity (e.g., RAID-4, RAID-5, RAID-6, or other variations of these RAID levels), the method 500 may be modified to take into account the parity data stored on one or more of the devices. FIG. 6A illustrates an example of a RAID-4 layout, and FIG. 6B illustrates an example of issuing discard commands to devices having the RAID-4 layout. In a RAID-4 system, the last device is used to store parity. Physical sectors with the same physical sector number across the devices are organized as one parity group (that is, sectors in the same row). Thus, if one device fails, data in a parity group on the device can be reconstructed from data in the same parity group on the other devices. FIG. 7A illustrates an example of a RAID-5 layout, and FIG. 7B illustrates an example of issuing discard commands to devices having the RAID-5 layout. RAID-5 is similar to RAID-4, except that the parity chunks are scattered over all the devices. FIG. 8A illustrates an example of a RAID-6 layout, and FIG. 8B illustrates an example of issuing discard commands to devices having the RAID-6 layout. RAID-6 is similar to RAID-5, except that RAID-6 has two parity sectors per parity group.

Before a discard command is issued to a RAID system that uses parity (e.g., RAID-4, RAID-5, RAID-6, or other variations of these RAID levels), the RAID driver module 150 determines whether any physical sectors in a discard range need to be preserved. A physical sector needs to be preserved when it protects a sector in another device. Thus, a physical sector can be discarded only when all of the other sectors in the same parity group (that is, in the same row shown in the figures) are also discarded. If one or more physical sectors in the discard range need to be preserved, the RAID driver module 150 adjusts the discard range to exclude these physical sectors.

In the examples of FIG. 5B and FIG. 6B, it is requested that physical sectors 10 to 45 (inclusive) be discarded. Nevertheless, physical sectors 10, 11, 12, 13, 14, 15 cannot be discarded, because they protect information for sectors 0-9 (which are valid data stored in other devices). Similarly, in the example of FIG. 7B, it is requested that physical sectors 10 to 34 (inclusive) be discarded. Nevertheless, physical sectors 10 and 11 cannot be discarded, because they protect information for sectors 0-9 (which are valid data stored in other devices).

In one embodiment, when the RAID driver module 150 receives a request to free a range of logical sectors (indicated by a starting sector M and a number of sectors N) in a RAID system that uses parity (e.g., RAID-4, RAID-5, RAID-6, or other variations of these RAID levels), the RAID driver module 150 performs the following calculation:

call stripe_map_sector for M, it returns device number S1 and physical sector P1 call stripe_map_sector for M+N, it returns device number S2 and physical sector P2 assign variables A and B:

if S1 is equal to zero, then A:=P1, else A:=(P1+chunk_size) rounded down to the chunk boundary;

if S2 is equal to the number of data devices−1 (for RAID-4 and RAID-5), or the number of data devices−2 (for RAID-6), then B:=P2, else B:=P2 rounded down to the chunk boundary;

if (A<B), then issue a discard command starting with A with the length (B−A) to all the devices.

In the calculation described in connection with a RAID system that uses parity, the RAID driver module 150 performs two divisions and two modulos for the discard command that is issued to all of the devices. Thus, for each request to free a range of contiguous logical sectors, a total of two divisions and two modulos are needed.

Figure 9:
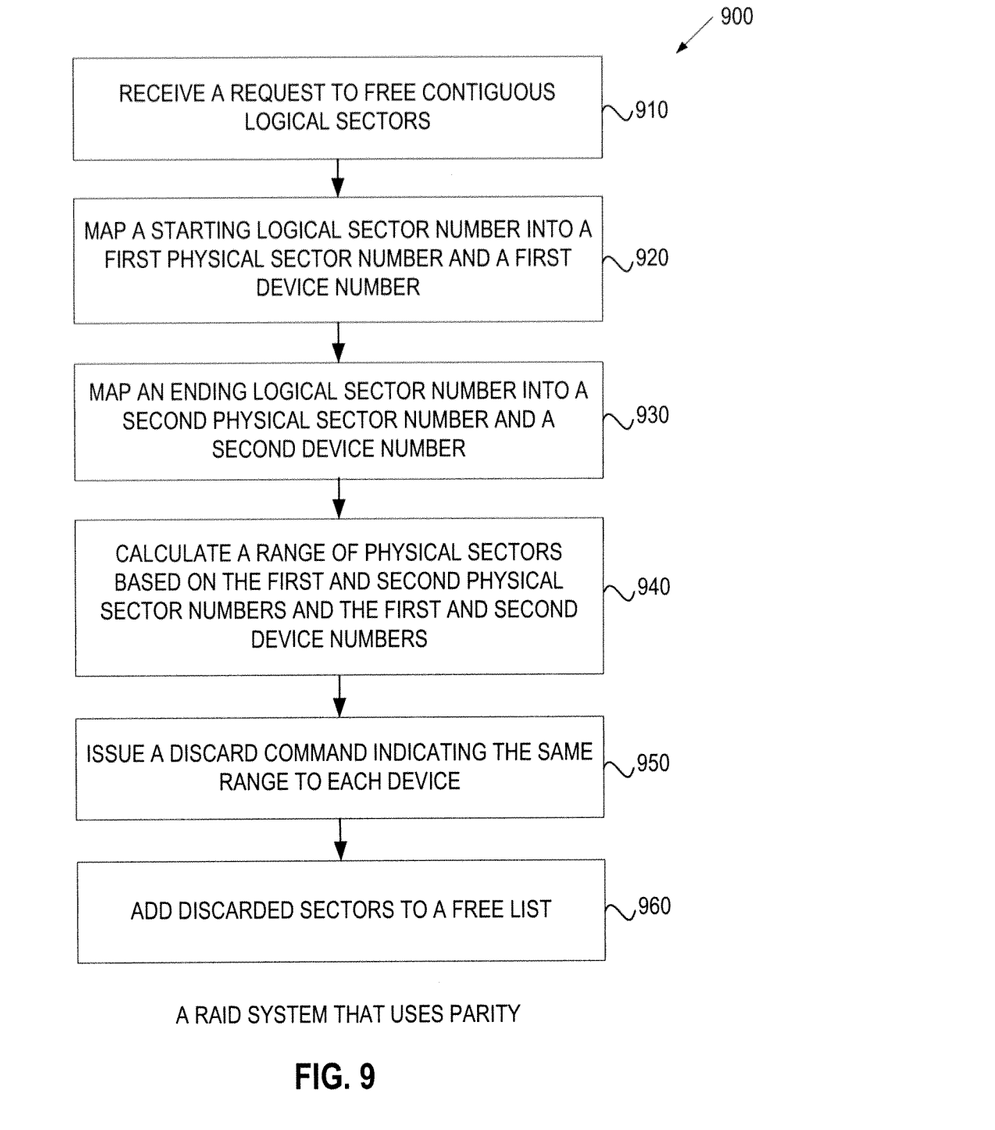
FIG. 9 is a flow diagram of one embodiment of a method for issuing discard commands to a RAID system that uses parity.

FIG. 9 is a flow diagram illustrating one embodiment of a method 900 for freeing storage space in a RAID system that uses parity (e.g., RAID-4, RAID-5, RAID-6, or other variations of these RAID levels). The method 900 may be performed by a computer system 1000 of FIG. 10 that may comprise hardware (e.g., circuitry, dedicated logic, programmable logic, microcode, etc.), software (e.g., instructions run on a processing device), or a combination thereof. In one embodiment, the method 900 is performed by the RAID driver module 150 of FIG. 1 and FIG. 2 in the computer system 100. It is understood that the method 500 is applicable to any RAID system with block-level striping, contiguous physical sectors can correspond to non-contiguous logical sectors, and where parity is used.

Referring to FIG. 9, in one embodiment, the method 900 begins when the RAID driver module 150 receives a request to free a range of contiguous logical sectors (block 910); e.g., when a file using these logical sectors is to be deleted. The request indicates a starting logical sector number (e.g., M) and the total number of sectors to deallocate (e.g., N). In response to the request, the RAID driver module 150 calculates a first physical sector number (P1) and a first device number (S1) based on the starting logical sector number M (block 920). The RAID driver module 150 also calculates a second physical sector number (P2) and a second device number (S2) based on the ending logical sector number (M+N) (block 930). From the first and second physical sector numbers and the first and second device numbers, the RAID driver module 150 calculates a range of physical sectors, where the same range is applicable to all of the devices (block 940). The RAID driver module 150 then issues a discard request to each device, indicating the same range to all of the devices (block 950). The discarded sectors can be added to a free list for reuse (block 960).

Figure 10:
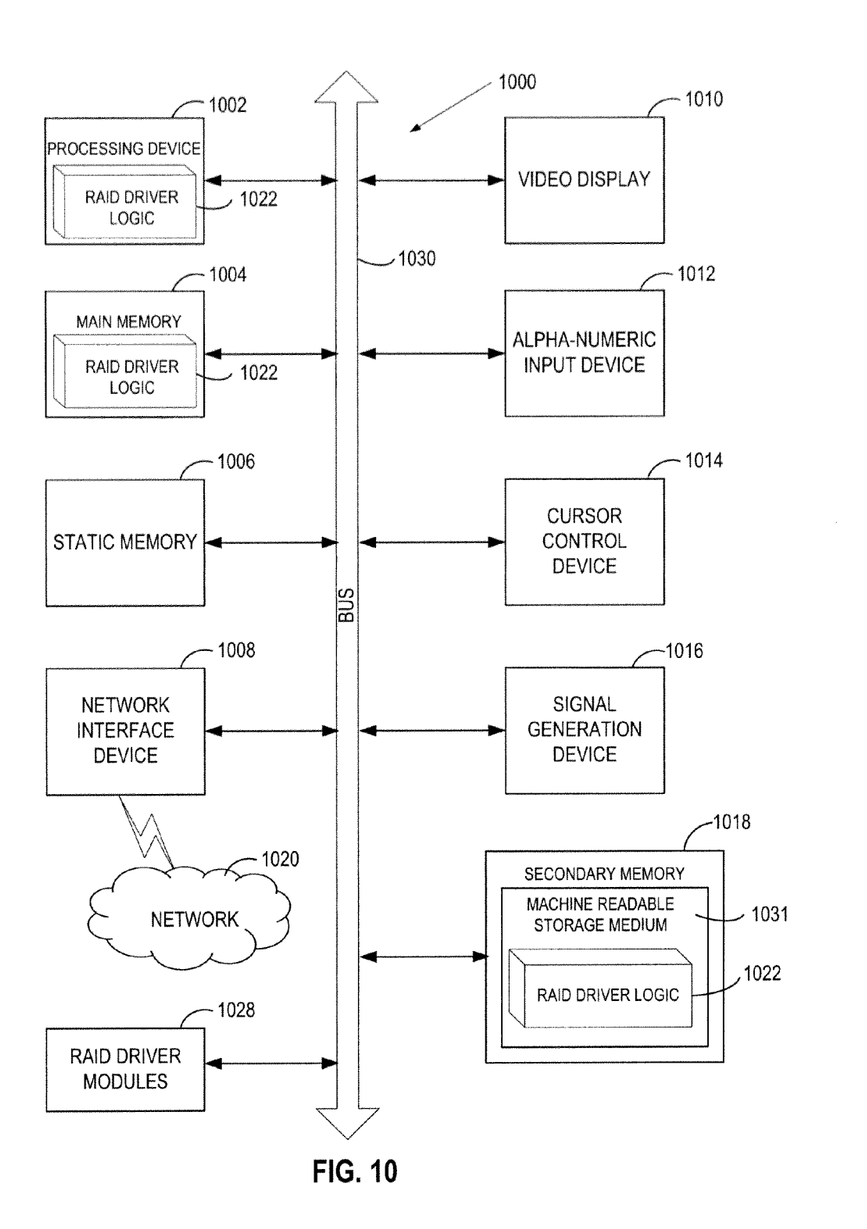
FIG. 10 illustrates a diagrammatic representation of a machine in the exemplary form of a computer system.

FIG. 10 illustrates a diagrammatic representation of a machine in the exemplary form of a computer system 1000 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 1000 includes a processing device 1002, a main memory 1004 (e.g., read-only memory (ROM), flash memory, dynamic random access memory (DRAM) such as synchronous DRAM (SDRAM) or Rambus DRAM (RDRAM), etc.), a static memory 1006 (e.g., flash memory, static random access memory (SRAM), etc.), and a secondary memory 1018 (e.g., a data storage device), which communicate with each other via a bus 1030.

The processing device 1002 represents one or more general-purpose processing devices such as a microprocessor, central processing unit, or the like. More particularly, the processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. The processing device 1002 may also be one or more special-purpose processing devices such as an application specific integrated circuit (ASIC), a field programmable gate array (FPGA), a digital signal processor (DSP), network processor, or the like. The processing device 1002 is configured to execute RAID driver logic 1022 for performing the operations and steps discussed herein.

The computer system 1000 may further include a network interface device 1008. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), and a signal generation device 1016 (e.g., a speaker).

The secondary memory 1018 may include a machine-readable storage medium (or more specifically a computer-readable storage medium) 1031 on which is stored one or more sets of instructions (e.g., RAID driver logic 1022) embodying any one or more of the methodologies or functions described herein (e.g., the RAID driver module 150 of FIGS. 1 and 2). The RAID driver logic 1022 may also reside, completely or at least partially, within the main memory 1004 and/or within the processing device 1002 during execution thereof by the computer system 1000; the main memory 1004 and the processing device 1002 also constituting machine-readable storage media. The RAID driver logic 1022 may further be transmitted or received over a network 1020 via the network interface device 1008.

The machine-readable storage medium 1031 may also be used to store the RAID driver logic 1022 persistently. While the machine-readable storage medium 1031 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine that causes the machine to perform any one or more of the methodologies of the present invention. The term "machine-readable storage medium" shall accordingly be taken to include, but not be limited to, solid-state memories, and optical and magnetic media.

The computer system 1000 may additionally include RAID driver modules 1028 for implementing the functionalities of the RAID driver 150 of FIGS. 1 and 2. The module 1028, components and other features described herein (for example in relation to FIG. 1) can be implemented as discrete hardware components or integrated in the functionality of hardware components such as ASICS, FPGAs, DSPs or similar devices. In addition, the module 1028 can be implemented as firmware or functional circuitry within hardware devices. Further, the module 1028 can be implemented in any combination of hardware devices and software components.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "issuing", "calculating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the required purposes, or it may comprise a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   receiving, by a processing device, a request to free a range of logical sectors that is mapped to a plurality of storage devices organized as Redundant Array of Independent Disks (RAID), each storage device of the plurality of storage devices partitioned into a plurality of partitions to store a respective plurality of physical sectors;
   identifying a first physical sector number corresponding to a first logical sector having a lowest number greater or equal than a starting logical sector number of the range of logical sectors;
   identifying a second physical sector number corresponding to a second logical sector having a lowest number greater or equal than an ending logical sector number of the range of logical sectors;
   identifying, in view of the first physical sector number and the second physical sector number, a range of physical sectors that includes all physical sectors of one or more parity groups; and
   issuing, by the processing device, a command to the plurality of storage devices to free the range of physical sectors.

2. The method of claim 1, wherein the RAID comprises solid state devices (SSDs).

3. The method of claim 1, wherein the storage devices are organized as RAID-0, RAID-4, RAID-5 or RAID-6.

4. The method of claim 1, wherein identifying the first physical sector number on a current storage device comprises:
   adding, to the first logical sector number modulo a partition size, a product of the partition size and an integer quotient of the first logical sector number and a number of storage devices.

5. The method of claim 4, further comprising:
   rounding down the physical sector number incremented by one to a partition boundary responsive to determining that an integer quotient of the first logical sector number and a partition size modulo a number of storage devices does not exceed an ordinal number of the current storage device.

6. The method of claim 4, further comprising:
rounding down the physical sector number to a partition boundary responsive to determining that an integer quotient of the first logical sector number and a partition size modulo a number of storage devices exceeds an ordinal number of the current storage device.

7. The method of claim 6, wherein rounding down the physical sector number comprises applying a bit mask.

8. A system comprising:
a plurality of storage devices organized as a Redundant Array of Independent Disks (RAID), each storage device of the plurality of storage devices partitioned into a plurality of partitions to store a respective plurality of physical sectors; and
a processing device operatively coupled to the plurality of storage devices, the processing device to:
receive a request to free a range of logical sectors that is mapped to the plurality of storage devices, each storage device partitioned into a plurality of partitions to store a plurality of physical sectors;
identify a first physical sector number corresponding to a first logical sector having a lowest number greater or equal than a starting logical sector number of the range of logical sectors;
identify a second physical sector number corresponding to a second logical sector having a lowest number greater or equal than an ending logical sector number of the range of logical sectors;
identify, in view of the first physical sector number and the second physical sector number, a range of physical sectors that includes all physical sectors of one or more parity groups; and
issue a command to the plurality of storage devices to free the range of physical.

9. The system of claim 8, wherein the RAID comprises solid state devices (SSDs).

10. The system of claim 8, wherein the storage devices are organized as RAID-0, RAID-4, RAID-5 or RAID-6.

11. The system of claim 8, wherein to identify the first physical sector number on a current storage device, the processing device is to:
add, to the first logical sector number modulo a partition size, a product of the partition size and an integer quotient of the first logical sector number and a number of storage devices.

12. The system of claim 11, wherein the processing device is further to:
round down the physical sector number incremented by one to a partition boundary responsive to determining that an integer quotient of the first logical sector number and a partition size modulo a number of storage devices does not exceed an ordinal number of the current storage device.

13. The system of claim 11, wherein the processing device is further to:
round down the physical sector number to a partition boundary responsive to determining that an integer quotient of the first logical sector number and a partition size modulo a number of storage devices exceeds an ordinal number of the current storage device.

14. The system of claim 13, wherein to round down the physical sector number, the processing device is to:
apply a bit mask.

15. A computer readable non-transitory storage medium comprising instructions to cause a processing device to:
receive, by the processing device, a request to free a range of logical sectors that is mapped to a plurality of storage devices organized as Redundant Array of Independent Disks (RAID), each storage device of the plurality of storage devices partitioned into a plurality of partitions to store a respective plurality of physical sectors;
identify a first physical sector number corresponding to a first logical sector having a lowest number greater or equal than a starting logical sector number of the range of logical sectors;
identify a second physical sector number corresponding to a second logical sector having a lowest number greater or equal than an ending logical sector number of the range of logical sectors;
identify, in view of the first physical sector number and the second physical sector number, a range of physical sectors that includes all physical sectors of one or more parity groups; and
issue, by the processing device, a command to the plurality of storage devices to free the range of physical sectors.

16. The computer readable non-transitory storage medium of claim 15, wherein the RAID comprises solid state devices (SSDs).

17. The computer readable non-transitory storage medium of claim 15, wherein the storage devices are organized as RAID-0, RAID-4, RAID-5 or RAID-6.

18. The computer readable non-transitory storage medium of claim 15, wherein executable instructions to identify the first physical sector number on a current storage device comprise executable instructions to cause the processing device to:
add, to the first logical sector number modulo a partition size, a product of the partition size and an integer quotient of the first logical sector number and a number of storage devices.

19. The computer readable non-transitory storage medium of claim 18, further comprising executable instructions to cause the processing device to:
round down the physical sector number incremented by one to a partition boundary responsive to determining that an integer quotient of the first logical sector number and a partition size modulo a number of storage devices does not exceed an ordinal number of the current storage device.

20. The computer readable non-transitory storage medium of claim 18, further comprising executable instructions to cause the processing device to:
round down the physical sector number to a partition boundary responsive to determining that an integer quotient of the first logical sector number and a partition size modulo a number of storage devices exceeds an ordinal number of the current storage device.

* * * * *